Figure 1:
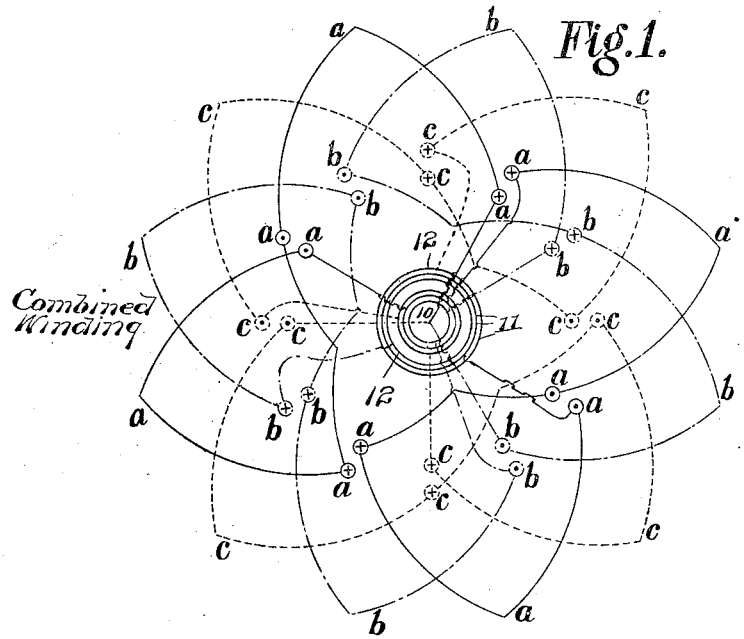

L. J. HUNT.
ROTOR WINDINGS FOR ALTERNATING CURRENT DYNAMO ELECTRIC MACHINES.
APPLICATION FILED AUG. 10, 1909.

1,057,061.

Patented Mar. 25, 1913.

5 SHEETS—SHEET 1.

Witnesses
H. Brooks
S. E. Dodge

Inventor
L. J. Hunt
By Beeler & Cobb, Attys.

L. J. HUNT.
ROTOR WINDINGS FOR ALTERNATING CURRENT DYNAMO ELECTRIC MACHINES.
APPLICATION FILED AUG. 10, 1909.
1,057,061.
Patented Mar. 25, 1913.
5 SHEETS—SHEET 2.
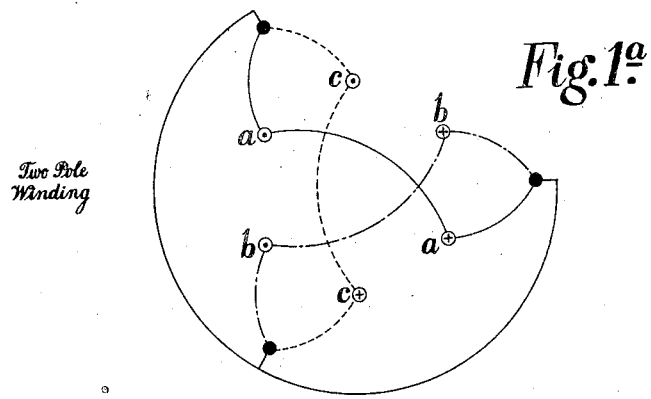
*Fig. 1ª*
Two Pole Winding
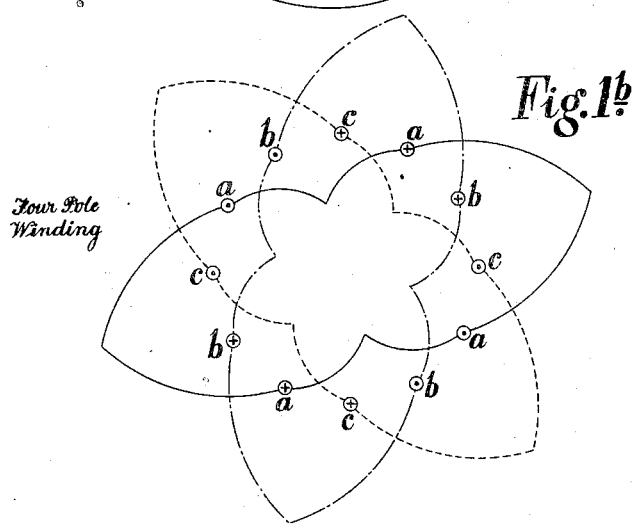
*Fig. 1ᵇ*
Four Pole Winding
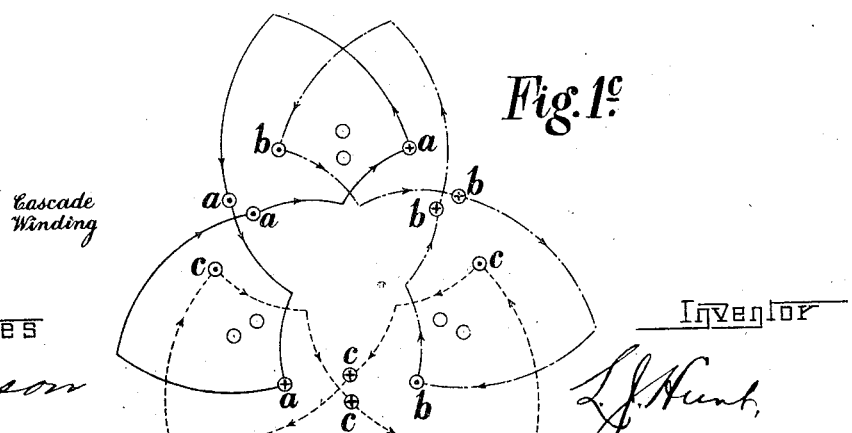
*Fig. 1ᶜ*
Cascade Winding
Witnesses
E. Larson
M. T. Taylor
Inventor
L. J. Hunt
By Beeler & Coble
Attorneys L. J. HUNT.
ROTOR WINDINGS FOR ALTERNATING CURRENT DYNAMO ELECTRIC MACHINES.
APPLICATION FILED AUG. 10, 1909.

1,057,061.

Patented Mar. 25, 1913.
5 SHEETS—SHEET 3.

L. J. HUNT.
ROTOR WINDINGS FOR ALTERNATING CURRENT DYNAMO ELECTRIC MACHINES.
APPLICATION FILED AUG. 10, 1909.

1,057,061.

Patented Mar. 25, 1913.
5 SHEETS—SHEET 4.

Witnesses
H. Brooks
S. E. Dodge

Inventor
L. J. Hunt,
By Beeler & Cobb,
Attys.

L. J. HUNT.
ROTOR WINDINGS FOR ALTERNATING CURRENT DYNAMO ELECTRIC MACHINES.
APPLICATION FILED AUG. 10, 1909.

1,057,061.

Patented Mar. 25, 1913.
5 SHEETS—SHEET 5.

Combined Winding
8 & 4 Poles

Combined Winding
8 & 4 Poles

Witnesses
W. Brooks
S. E. Dodge

Inventor
L. J. Hunt,
By Beeler & Robb, Attys.

UNITED STATES PATENT OFFICE.

LOUIS JOHN HUNT, OF SANDYCROFT, ENGLAND, ASSIGNOR TO GENERAL ELECTRIC COMPANY, A CORPORATION OF NEW YORK.

ROTOR-WINDINGS FOR ALTERNATING-CURRENT DYNAMO-ELECTRIC MACHINES.

1,057,061.  Specification of Letters Patent.  Patented Mar. 25, 1913.

Application filed August 10, 1909. Serial No. 512,193. REISSUED

*To all whom it may concern:*

Be it known that I, LOUIS JOHN HUNT, a subject of the King of Great Britain, residing at Sandycroft, in the county of Flint, in the Principality of Wales, England, have invented certain new and useful Improvements in Rotor-Windings for Alternating-Current Dynamo-Electric Machines, of which the following is a specification.

This invention relates to alternating current dynamo-electric machines of the type in which there are two windings or the equivalent of two windings on both the stator and rotor. Such machines are old and it has heretofore been proposed to connect machines of this character so that they may be operated at one of three speeds; one speed being obtained by connecting one of the stator windings to the source of supply and short-circuiting the other stator winding, or the equivalent thereof, in which case the two rotor windings operate in concatenation; and the other two speeds being obtained by connecting one or the other of the stator windings to the source of supply and short circuiting one or the other of the windings on the secondary member by means of a set of collector rings. One machine of this type is illustrated in my United States Patent Reissue No. 13,354, dated Jan. 9, 1912.

As I have heretofore shown in my British Patent No. 15,711 of 1906, it is possible to simplify the two windings on the rotor in such a manner as to considerably reduce the amount of copper in such windings, when the rotor windings operate in concatenation.

My present invention has for its object a further improvement of the rotor windings which, while still retaining all the advantages for the cascade connection as described in my British Patent No. 15,711 of 1906, permits the machine to be operated at either of the other speeds.

Briefly, my invention consists in adding to the rotor windings of the British patent above referred to, other windings which are adapted to be connected in circuit when the motor is operating at either of the two speeds resulting from connecting one or the other of the stator windings, or their equivalent, to the source of supply, these additional windings being so designed and connected that they operate effectively for either of the two speeds.

My invention will best be understood from the following description taken in connection with the accompanying drawings, in which—

Figure 2:
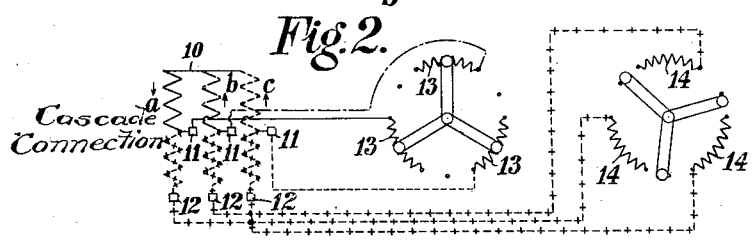
Figure 3:
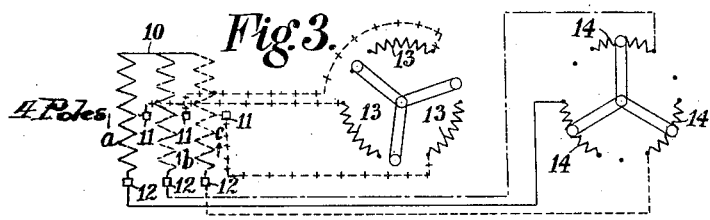
Figure 4:
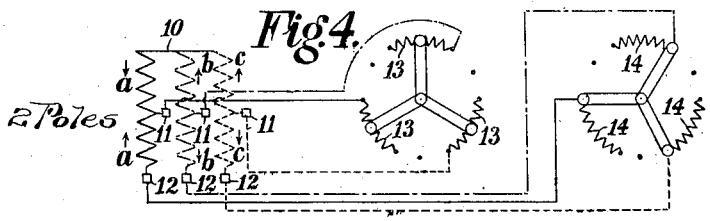
Figure 11:
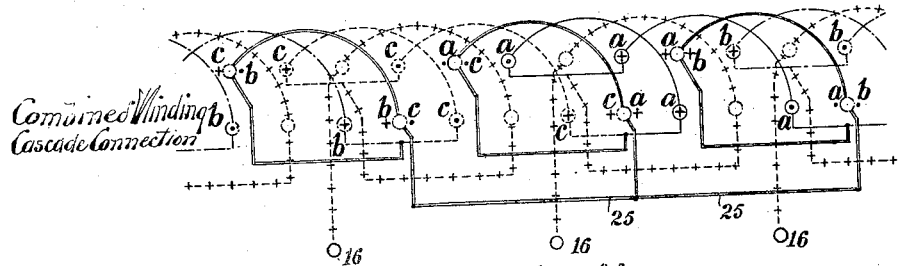
Figure 12:
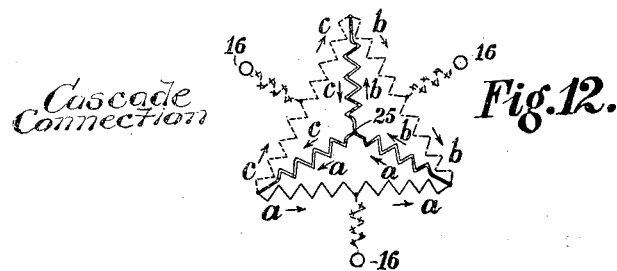
Figure 13:
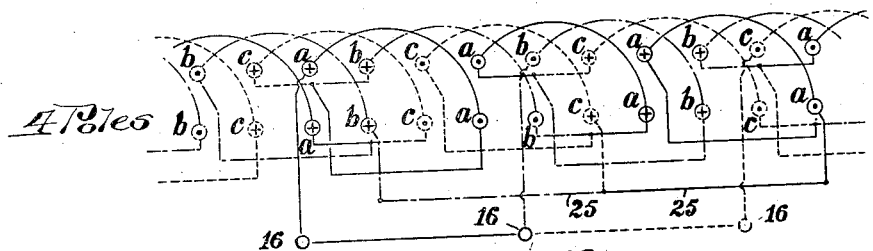
Figure 14:
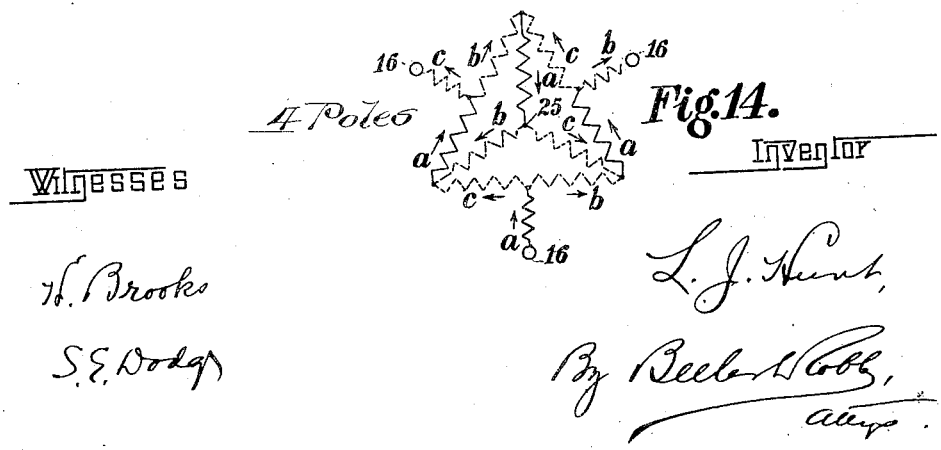
Figure 15:
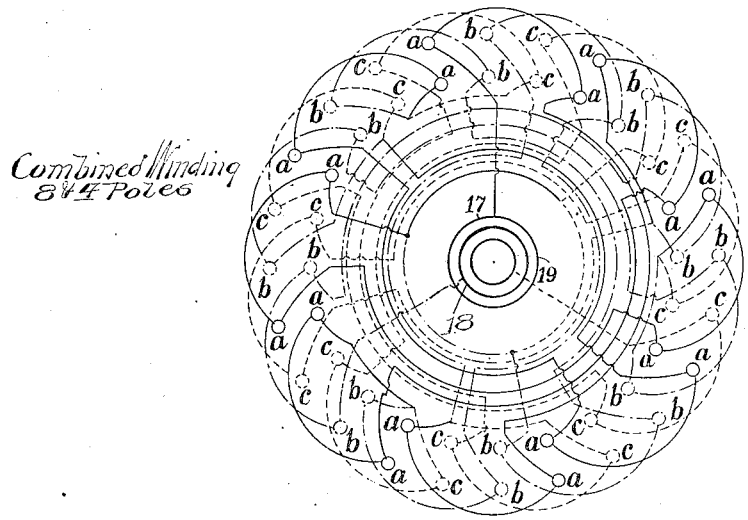
Figure 16:
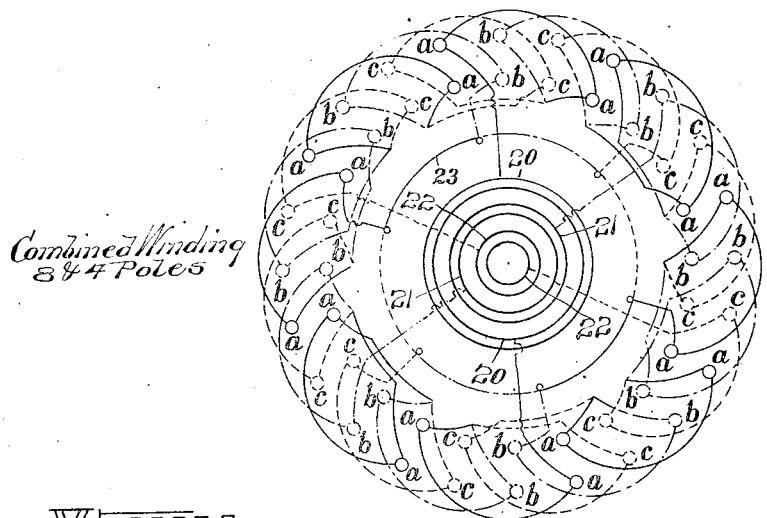

Figure 1 illustrates a rotor winding of the type shown in Fig. 1ᶜ, adapted to give 4 and 2 poles at cascade speed, but modified by the addition of further bars and slip rings so as to have three normal speeds of rotation; Figs. 1ᵃ, 1ᵇ and 1ᶜ are diagrams illustrating the method of combining separate pole windings into a composite winding having corresponding sets of poles connected in concatenation at cascade speed as hereinafter explained; Figs. 2, 3 and 4 are key diagrams showing the connections of the windings of Fig. 1 for the three respective speeds; Figs. 5 and 6, explained hereinafter, correspond to Figs. 8 and 9 of German patent specification No. 206,533, and illustrate respectively the bars of a basal 4 pole and 2 pole winding on a rotor, and the resultant windings giving the same effect, with redundant bars canceled, and bars used in certain slots to carry resultant currents compounded of two currents differing in phase by 60 degrees; Fig. 7 shows the resultant winding of Fig. 6, with further bars added in the vacant slots and slip rings connected thereto; Fig. 8 is a key diagram explaining the flow of currents in the winding of Fig. 7, when the slip rings are not connected; Fig. 9 shows the winding of Fig. 7, with the slip rings connected so as to give the higher speed of rotation; Fig. 10 is a key diagram corresponding to Fig. 9; Fig. 11 shows a further simplified form of winding giving four poles and two poles respectively at cascade speed, and Fig. 12 is a key diagram corresponding thereto showing the flow of current at cascade speed; Fig. 13 shows the winding of Fig. 11 with the slip rings connected so as to give the higher speed of rotation; Fig. 14 is the key diagram corresponding to Fig. 13; Figs. 15 and 16 show a winding of the type illustrated in Figs. 11 and 14, but designed to give 8 poles and 4 poles respectively at cascade speed. The two figures show respectively series and parallel connections of two parts of the winding as hereinafter explained.

When two machines are connected in cascade the rotors of both machines are mounted on the same shaft, and, as is well known, an alternating current is supplied to the stator of one machine producing therein a field rotating in one direction which may be called positive. The rotor revolves in the direction of the rotating field, and has induced in it currents which cause the rotor to give the same number of poles as the stator field. The windings on the rotor are connected to the rotor windings of the second machine mounted on the same shaft, and the connections are generally such that a rotating field is produced in the second rotor revolving in the opposite direction to the first field i. e. in the negative direction. This field acts inductively on the winding of the second stator producing a corresponding field, and the induced currents may be regulated by inserting resistances between the parts of the stator winding. The normal speed of rotation of the combination is equivalent to that of a machine having a number of poles corresponding to the sum of the numbers of poles of the two machines. This same idea has been carried into practice in machines having one stator and one rotor each of which is provided with two windings or the equivalent of two windings. The current is supplied in such cases to one winding on the stator which acts inductively in connection with part of the winding on the rotor or secondary member which is arranged to give the same number of poles. The currents flow from this part into the other part of the winding on the rotor developing a different number of poles rotating usually in an opposite direction to that in which the rotor is revolving. The second part of the rotor winding acts inductively in relation to the second winding on the stator which is arranged to have a corresponding number of poles.

Such machines as are described above are already well known and will need no further description here. An improvement upon them has been introduced recently, this improvement consisting in a modification of the windings on the rotor and a reduction in the number of bars required, by omitting from the two windings on the rotor any pairs of bars which would carry resulting currents flowing in opposite directions and neutralizing the magnetic effects of each other. In some cases also it has been proposed, where two bars lie together and carry currents in two of three phases, that these two bars should be replaced by a single bar carrying a current in the third phase which would obviously be equivalent magnetically. Such windings have been described in the specification of British Patent No. 15711 of 1906 and of German Patent No. 206533. In order that the said windings may be understood without the necessity of referring to the specifications of the said patents, the following supplementary description is given of these windings. For this purpose reference is had to Figs. 1ª, 1ᵇ and 1ᶜ of the accompanying drawings.

In Fig. 1ª is illustrated diagrammatically a three-phase two-pole winding having one conductor per pole per phase. Thus $a$, $a$ are the conductors for one phase, $b$, $b$ those for the second, and $c$, $c$ those for the third. The winding it will be seen is mesh-connected. Fig. 1ᵇ shows a three-phase four-pole winding also with one conductor per pole per phase, each phase in this case being short-circuited upon itself. The sign upon each conductor indicates the direction of the current in that conductor at a particular instant. Fig. 1ᶜ shows the resulting winding on the rotor obtained by superimposing the windings of Figs. 1ª and 1ᵇ and omitting bars which neutralize the magnetic effects of each other. By laying the winding of Fig. 1ª over that of Fig. 1ᵇ it will be seen that at three points there are pairs of bars carrying currents which neutralize each other, and these can therefore be omitted. The remaining bars can be connected up in any suitable way, either as shown with each phase short circuited on itself, or in a mesh or star connection, such that currents in the proper phase and direction shall flow in the respective bars.

In the specification of German Patent No. 206533 a further modification is described consisting in substituting where possible for two bars carrying currents 60° apart in phase, a single bar of larger section carrying a combined current having the same resultant magnetic effect as the two separate currents. This is explained hereinafter with reference to Figs. 5 and 6 of the drawings.

The invention can be applied to windings having any of the relative number of poles as defined below. In most cases in the following description windings giving the equivalent of four poles and two poles respectively when running at cascade speed will be illustrated and explained, but it is to be understood that these numbers of poles have been chosen for simplicity of description only, and in practice larger numbers of poles would generally be used, e. g. eight and four poles, or twelve and eight poles, which would give balanced forces on the rotor at all speeds of rotation; in fact for satisfactory working and symmetrical distribution of the forces the two numbers of poles for the rotor winding must be such that when these numbers are divided by their greatest common factor, the one dividend must be odd and the other even while the common factor itself must be greater than two. It is to be further understood that only the rotor windings are described here, but these must be used with suitable stator windings giving corresponding numbers of poles. Stator windings suitable for this purpose have been described for instance in the specification of United States Patent No. 926192. When the rotor windings are giving their two distinct numbers of poles, i. e., when the machine is running at cascade speed, the stator windings of this type are interconnected so as to also give fields of corresponding numbers of poles, as explained in the specification of the said prior patent. The stator windings will not be further dealt with here, and it will be assumed that they are well known and understood.

In all cases three phase currents will be dealt with, and in all the drawings the following convention will be made:—Full lines will represent the one phase marked a, which will be assumed to be carrying current of the maximum value at the moment chosen while the two other phases marked b and c will be indicated respectively by chain dotted (— . — . —) and plain dotted (- - - - - - - -) lines, and will be assumed to be carrying currents of half the maximum value at the same instant; hence at a star connection between the three phases a, b, and c, the current will be flowing in say at a, and dividing equally between b and c through which it flows out. A further distinctive symbol is required for parts of the windings which are carrying no current when the connections are made in certain ways; such windings will be indicated by crosses alternating with dots (+ — + — + — +).

Referring now to Fig. 1, it will be seen that the winding illustrated in Fig. 1c has been taken, and the ends of each phase have been opened up. One end of each phase is brought to a star connection 10, while the other end is brought to slip rings marked 11. From these slip rings connections are made to windings, the bars of which lie in the slots left blank by the cancellation of redundant bars in the manner already known, these windings each terminating in slip rings marked 12. The crosses on the circles representing the bars indicate currents flowing downward, and the dots indicate currents flowing upward respectively.

Referring now to Fig. 2, it will be seen that the three slip rings 11 are connected together through resistances 13 which may be cut out while the slip rings 12 are left open so that no currents flow in the additional bars lying between the connections to the slip rings 11 and 12. The flow of currents in the bars is now exactly the same as in the winding shown in Fig. 1c, and the speed is that of a cascade motor wound for 4 poles and 2 poles respectively. This is the lowest speed and corresponds to that of a simple motor having 6 poles upon it.

Referring now to Fig. 3, it will be seen that the slip rings 11 have been disconnected while the slip rings 12 are connected through resistances 14 which can be cut out, and the flow of current is now as indicated in the diagram Fig. 1, and the rotor gives 4 poles only. The speed is therefore increased in the ratio of three to two as compared with the cascade speed.

Fig. 4 shows the connections for getting a third speed of rotation. In this case the slip rings 12 are directly connected or short-circuited by switch blades 14, while the resistances 13 which may be cut out, are connected between the slip rings 11. The connections on the stator will have been changed over in well known manner, and the rotor will now carry current flowing in the windings as indicated by the arrows in the key diagram Fig. 4, and giving only 2 poles; hence the speed of rotation will be double that for the connections shown in Fig. 3 and three times that for the connections shown in Fig. 2. Evidently, if this winding were only required to have two normal speeds of rotation, there could be a permanent connection instead of the three slip rings 11 with their resistances 13, and only the slip rings 12 with their resistances 14 would be required for getting the second speed.

Although the winding above described is simple to understand and can be used in practice, yet it is not the most satisfactory form for carrying out this invention for various reasons. There is a good deal of magnetic leakage, and the magnetizing current required for running at cascade speed (Fig. 2) is twice that required for running at either of the other speeds. It is possible however to use windings in which the ratio of the currents required for the two speeds is less than two to one, and in which the $C^2R$ losses and magnetic leakage are also less than they would be with the winding above described.

Figs. 5 to 10 show how the better form of winding can be produced. Fig. 5 shows the arrangement of the bars of two separate 3-phase windings giving respectively 4 poles and 2 poles on the rotor (rotating in opposite directions in the manner already understood). Fig. 6 shows the resultant winding with the pairs of bars omitted which in Fig. 5 neutralize the action of one another, so as to leave only one bar in certain of the slots. In the other slots two of the bars carry currents differing in phase by 60 degrees (as explained below) in the original winding Fig. 5, and these have been replaced by a single bar (shown in Fig. 6 by two bars bound together) carrying a resultant current which is 1.73 times that for any single bar in the original winding, and gives the same effect magnetically as the two bars which it replaces in the winding shown in Fig. 5. The resultant winding in Fig. 6 is already known, and is described as already stated in the specification of German Patent No. 206533.

The bars at the bottom of the windings in Fig. 6 are connected in mesh as shown, while the windings carrying the resultant (1.73 value) currents are joined to the points of the mesh and unite in a star connection 25. According to the present invention this winding is modified to give two normal speeds in the following way. Referring to Fig. 7, it will be seen that in each of the slots which carries only one bar in Fig. 6, two additional bars have been inserted, lying side by side, each of these being half the section of the other bars in the winding and insulated one from the other. These bars are connected with the slip rings 15 on the one hand and on the other hand to the mid-points of the mesh portions of the winding of Fig. 6, as illustrated in the key diagram Fig. 8. When the slip rings are not connected together the flow of current in the windings is as illustrated in Figs. 7 and 8. The bars carry currents in the same direction and phase as in Fig. 6 so that the rotor runs at the cascade speed corresponding to 4 and 2 poles. When the slip rings 15 are connected together as illustrated in Fig. 9 the additional bars now carry currents and the windings simply produce 4 poles on the rotor. Fig. 10 shows the flow of currents in this case.

Comparing the pairs of Figs. 7 and 8, 9 and 10, the following will be noticed. With the connections as in 7 and 8, the windings marked with two letters, which are connected in star and are shown by double lines, carry currents which are the resultant of currents in two phases 60 degrees apart. The current in phase $a$ flowing upward in any bar will be 120 degrees distant in phase from currents in phases $b$ and $c$ flowing downward in a parallel bar. It is however only 60 degrees in phase distant from current in either phase $b$ or $c$ flowing upward (or in the same direction as $a$) in any bar. Similarly, currents in the phases $b$ and $c$ flowing in opposite directions are only 60 degrees apart in phase. The center star-connected bars in Fig. 8 have the letters beside them indicating the two phases they are carrying at the moment chosen, and the directions of flow of currents in these two phases, from which it will be seen what resultant current is being carried by each of these star connections. These resultant currents are 1.73 times the currents in the other bars as already explained. Now it will be seen that with the connections as in Figs. 9 and 10 none of the bars are carrying these resultant currents compounded of two currents 60 degrees apart in phase, but all the bars are carrying simple currents in one of the three principal phases, and the currents in the star-connected bars are twice as great as those in the other bars, as indicated by the two letters beside these bars. The current density therefore in the half width bars, in the slots containing three bars, will be double the current density in the other normal bars.

Referring now to Figs. 11 and 14, it will be seen how the winding can be further simplified and the use of half width bars can be entirely avoided. Fig. 11 shows a 4 pole and 2 pole winding in which the respective bars are carrying exactly the same currents as the corresponding bars in Fig. 7, but the end connections are modified as shown, and there is now only one bar in each of the slots connected to the slip rings 16. The windings of these slip rings are as before connected to the mid-points of the mesh portions of the main winding, as is seen more clearly for instance in the key diagram Fig. 12, while the mid-portions of the winding which carry resultant (1.73 value) currents are connected in star at 25 as before. When the slip rings are not connected together and there is no current in the two added bars in series with each slip ring, the flow of current is as indicated in Figs. 11 and 12, which is exactly equivalent as stated to the flow in Figs. 7 and 8, and the winding gives 4 poles and 2 poles. When the slip rings are connected however, as shown in Figs. 13 and 14, the flow of the currents is very much altered. There are only two bars in each slot, and these are carrying currents in each case in the same phase and direction so as to give exactly the same magnetic effect as Figs. 9 and 10 in so far as the number of poles is concerned. Each bar throughout the winding when connected as in Figs. 13 and 14, is carrying current of the same root mean square value so that to give the same magnetic effect as the winding of Figs. 9 and 10 the R. M. S. current in each bar must be half as much again as the currents in the bars of Figs. 9 and 10. The $C^2R$ losses are in this case considerably reduced, the bars being all made of the proper size to carry the currents when flowing as in Figs. 13 and 14 i. e. at the non-cascade speed.

In practical windings giving say 8 and 4 poles the design will be exactly the same as that above described, the winding repeating itself two or more times around the circumference of the rotor according to the number of poles chosen. There are two possible ways of connecting these sets of windings as will be evident, viz;—they may be connected in series, or in parallel, depending on circumstances.

Fig. 15 shows the winding of Figs. 11 to 14 duplicated around the circumference of a rotor and adapted to give 8 and 4 poles respectively. The duplicated windings are here connected in series and are brought out to slip rings connected respectively to the points 17, 18 and 19. This is suitable particularly for small machines where the voltage would be too low if the coils were in parallel. It will be seen however that the end connections are lengthy and complicated, and for larger machines the connections can be made much simpler by arranging the duplicated sets of coils in parallel as shown in Fig. 16, where 23 is a star connection to which one end of each coil is connected, while the other ends of the windings for each phase are brought out to pairs of points 20, 21 and 22, each of which pairs is attached to a slip ring. It will be evident to any electrical engineer that either of the methods shown in Figs. 15 or 16 can be adopted according to circumstances, and according to the numbers of poles required, which may make it simpler to use one or other form of connection.

It is to be noted that wherever in this specification one bar has been shown in the drawing and referred to, obviously two or more bars could be used, so that each pair of bars may represent a coil or any multiple of two bars per slot. This will be obvious to any electrical engineer. Again, it is to be noted that in any of the windings as hereinbefore described where only one set of slip rings has been referred to, which slip rings form one neutral point in the winding when they are directly connected, there is always one other such neutral point at least in the winding, and generally several other such points which have been shown as permanently connected. If required these connections may be opened out and brought to slip rings between which resistances can be inserted so as to enable the speed of rotation to be further controlled by the cutting out of these resistances. This modification will also be obvious to any electrician and need not be further dwelt upon. It is evident too, that by suitably arranging the connections, the windings could be made when cascade connected, to give the effect of the difference of their basal number of poles instead of their sum, if this should be required; it is already well-known how to do this, and no explanation of it will be needed beyond the statement that in designing such a winding, the two initial windings on the rotor from which the redundant bars are to be canceled would be arranged so that their phases would rotate in the same direction, and then the redundant bars would be left out, and bars connected to slip rings, as already explained, and carrying currrents in the appropriate phases, would be inserted in the slots in which spaces are left.

Although the invention has been described as applied to the rotor windings of alternating current motors, it will be obvious that if for any reason the functions of the stationary and rotating members of the machine are interchanged, the invention will be equally applicable to the member which is then stationary and which corresponds to the "rotor" or secondary member hereinbefore referred to; the term "rotor" as used in the description must be read to cover this use of the invention. Finally, I desire it to be understood that my invention is not limited to an alternating current dynamo electric machine, the windings of which are arranged to be connected in concatenation, and that it may be used in a two speed alternating current motor, the rotor of which is adapted to run at either one or another speed corresponding to the basal numbers of poles of the stator winding, and I aim in the appended claims to cover all such and other modifications which do not depart from the spirit and scope of my invention.

I declare that what I claim is:—

1. In an alternating current electric motor having stationary and rotating members with windings on each member adapted to give two different basal number of poles for cascade working, the basal windings on one member being united together by omitting redundant conductor bars of the winding, the combination with the united winding so obtained, of further windings on the same member adapted to be interconnected with said united windings in such a manner that the said windings operate together to give one of their basal pole numbers in place of the two cascade working pole numbers.

2. In an alternating current electric motor having stationary and rotating members with windings on each member adapted to give two different basal numbers of poles for cascade working, the basal windings on one member being united together by omitting redundant conductor bars of the winding, the combination with the united winding so obtained, of further windings on the same member, and means for so connecting said further windings in circuit with said basal windings that the said windings operate together to give one of their basal pole numbers in place of the two cascade working pole numbers.

3. In an alternating current electric motor having stationary and rotating members with windings on each member adapted to give two different basal numbers of poles for cascade working, the basal windings on one member being united together with the omission of redundant conductor bars of the windings, the combination with the united windings so obtained, of further windings adapted to be interconnected in star between terminal points in the first winding, and means for so connecting said further windings in circuit with said basal windings that the said windings operate together to give one of the basal pole numbers in place of the two cascade working pole numbers.

4. In an alternating current electric motor having stationary and rotating members with windings on each member adapted to give two different basal numbers of poles for cascade working, the basal windings on one member being united together with the omission of redundant conductor bars of the windings, and the replacement of pairs of bars lying together which carry currents 60 degrees apart in phase by single bars carrying a resultant current compounded of these two currents, the combination with the united windings so obtained, of further windings adapted to be interconnected in star between terminal points in the first winding and a set of slip rings connected to said further winding, and means for connecting said slip rings together whereby the flow of currents in the windings can be changed so as to produce one of the basal pole numbers in place of the two cascade-working pole numbers.

5. In an alternating current electric motor having stationary and rotating members with windings on each member adapted to give two different basal numbers of poles for cascade-working, the basal windings on one member being united together by omitting redundant conductor bars of the windings and by using single bars to replace any pairs of bars lying together and carrying currents 60 degrees apart in phase to produce a mesh connected winding having a star connection from the points of the mesh, the combination with the said united windings of further windings and means for connecting them in star with the mid-points of the mesh portions of the said united windings and a set of slip rings connected to said further windings, and means for connecting said slip rings together whereby the flow of currents can be altered and the windings can be caused to give one of the basal pole numbers in place of the two cascade-working pole numbers.

6. In an alternating current electric motor having stationary and rotating members with windings on each member adapted to give two different basal numbers of poles for cascade-working, the basal windings on one member lying in slots therein and being united together by omitting redundant conductor bars of the windings and by using single bars to replace any pairs of bars lying together and carrying currents 60 degrees apart in phase to produce a mesh connected winding having a star connection from the points of the mesh, the combination with the said united windings of further windings whose bars occupy the slots in which spaces are left by the omission of the said redundant bars of the basal windings, and means for connecting said further windings in star between the mid-points of the mesh portions of the said united windings, and a set of slip rings connected to said further windings, and means for connecting said slip rings together whereby the flow of said slip rings together whereby the flow of currents can be altered and the windings can be caused to give one of the basal pole numbers in place of the two cascade-working pole numbers.

7. In combination with an induction motor having its windings normally arranged to produce a cascade effect of different basal numbers of poles, and the secondary member carrying in the same slot only conductors producing a like resultant magnetic effect, of additional windings carried by said secondary arranged to be interconnected with the normally connected windings to furnish additional paths for the flow of currents and causing a resultant magnetic effect corresponding to one of the basal numbers of poles, and means for connecting and disconnecting said additional windings.

8. In combination with an induction motor having its windings normally arranged to produce a cascade effect of different basal numbers of poles, and the secondary member carrying in the same slot only conductors producing a like resultant magnetic effect, of additional windings carried by said secondary arranged to be interconnected with the normally connected windings to furnish additional paths for the flow of currents and causing a resultant magnetic effect corresponding to one of the basal numbers of poles, means for connecting the neutral points of said normally arranged windings, and means for connecting the neutral points of said additional windings.

9. An induction motor comprising a secondary member having interconnected star and delta connecting windings arranged to produce sets of poles of different basal numbers normally in concatenation at cascade speed, and an additional winding having symmetrical portions connected in star-arrangement with symmetrical intermediate points of said first-named windings, and means for connecting or disconnecting said additional winding.

10. An induction motor comprising a secondary member having windings arranged to produce sets of poles of different basal numbers normally connected in concatenation at cascade speed, and an additional winding having symmetrical portions thereof connected to neutral points in the first-named windings and to slip rings, and means for connecting or disconnecting said rings, said additional winding when connected furnishing additional paths for the flow of currents and causing a resultant magnetic effect corresponding to one of said basal numbers of poles.

11. An induction motor comprising a secondary member having windings arranged to produce sets of poles of different basal numbers normally connected in concatenation at cascade speed, and an additional winding having symmetrical portions connected in star arrangement with symmetrical intermediate points of said first-named windings.

12. In combination with an induction motor having its windings arranged to produce different basal numbers of poles for cascade working, and the secondary member carrying in the same slot only conductors producing a like resultant magnetic effect, of additional windings carried by said secondary adapted to be interconnected with said first mentioned windings in such a manner that the said windings operate together to give one or another of the basal number of poles.

13. An induction motor comprising a secondary member having interconnected star and delta connected windings arranged to produce sets of poles of different basal numbers for cascade working, and an additional winding having symmetrical portions connected at one of their ends with symmetrical intermediate points of said first named windings, and means for connecting the other ends of the symmetrical portions of said additional winding together.

14. An induction motor comprising primary and secondary members with windings on each member adapted to produce sets of poles of different basal numbers for cascade working, and an additional winding having symmetrical portions thereof connected to symmetrical intermediate points in the first named winding and to slip rings, and means for connecting said rings, said additional winding causing a resultant magnetic effect corresponding to one or the other of said basal number of poles depending on the connections of the primary member.

In witness whereof, I have hereunto signed my name this 28th day of July 1909, in the presence of two subscribing witnesses.

LOUIS JOHN HUNT.

Witnesses:
 HUBERT A. GILL,
 THOMAS S. SHILLINGTON.

Copies of this patent may be obtained for five cents each, by addressing the "Commissioner of Patents, Washington, D. C."